United States Patent
Anderson

(10) Patent No.: US 7,637,436 B1
(45) Date of Patent: Dec. 29, 2009

(54) METHOD, SYSTEM AND PROGRAM PRODUCT FOR PRINTING BARCODES WITHIN COMPUTER APPLICATIONS

(76) Inventor: Brant Anderson, 4506 W. Dale Ave., Tampa, FL (US) 33609

(*) Notice: Subject to any disclaimer, the term of this patent is extended or adjusted under 35 U.S.C. 154(b) by 149 days.

(21) Appl. No.: 11/613,303

(22) Filed: Dec. 20, 2006

Related U.S. Application Data

(60) Provisional application No. 60/868,360, filed on Dec. 4, 2006.

(51) Int. Cl.
*G06K 19/06* (2006.01)

(52) U.S. Cl. .......... 235/494; 235/432; 235/462.01; 235/462.02; 235/462.07; 235/462.16

(58) Field of Classification Search .......... 235/432, 235/462.01, 462.02, 462.07, 462.12, 494
See application file for complete search history.

(56) References Cited

U.S. PATENT DOCUMENTS

| | | | | |
|---|---|---|---|---|
| 4,794,239 A | * | 12/1988 | Allais | 235/462.1 |
| 5,298,731 A | * | 3/1994 | Ett | 235/462.02 |
| 5,304,786 A | * | 4/1994 | Pavlidis et al. | 235/462.07 |
| 6,062,481 A | * | 5/2000 | Storch et al. | 235/494 |
| 6,204,289 B1 | * | 3/2001 | Eterovic et al. | 514/451 |
| 6,279,828 B1 | * | 8/2001 | Fann | 235/462.01 |
| 6,286,406 B1 | * | 9/2001 | Viswanadham et al. | 83/835 |
| 6,902,114 B2 | * | 6/2005 | Hashimoto et al. | 235/462.25 |
| 7,350,708 B2 | * | 4/2008 | Melick et al. | 235/462.01 |
| 2005/0133608 A1 | * | 6/2005 | Baiera | 235/494 |

* cited by examiner

*Primary Examiner*—Daniel A Hess
*Assistant Examiner*—Ali Sharifzada
(74) *Attorney, Agent, or Firm*—Larson & Larson, P.A.; Frank Liebenow

(57) ABSTRACT

An application for generating a printable barcode object representing data from within a software application includes converting the data into a symbol string based on a barcode standard and assembling a plurality of block code characters from a font into the printable barcode object. The block code characters representing the symbol string are any two or more Unicode characters selected from the group consisting of $9600_{10}$, $9604_{10}$, $9608_{10}$, $9612_{10}$, $9616_{10}$, $9617_{10}$ and $32_{10}$.

25 Claims, 5 Drawing Sheets

METHOD, SYSTEM AND PROGRAM PRODUCT FOR PRINTING BARCODES WITHIN COMPUTER APPLICATIONS

CROSS-REFERENCE TO RELATED APPLICATION

This application is related to U.S. patent application Ser. No. 60/868,360, filed Dec. 4, 2006, the disclosure of which is hereby incorporated by reference.

BACKGROUND OF THE INVENTION

1. Field of the Invention

This invention relates to the field of barcodes and more particularly to a system for printing barcodes from within a standard application.

2. Description of the Related Art

Barcodes and the printing of such have been well known and heavily utilized for many years. It is difficult to find a product in the US market that doesn't have an associated barcode for tracking and/or check-out purposes. Most containers, packages and wrappers carry a barcode to identify their contents. Barcodes help track these packages and accurately identify them to sales personnel during a sales checkout process, thereby assuring accurate billing and inventory management. It only takes seconds to scan an object during inventory or checkout, whereas many seconds would be required to key in a description or product-id of the product.

Besides being efficient, barcodes are more accurate than keying in the same information. Barcodes have been shown to be at least 99% accurate, whereas operator data entry of identification numbers is far less accurate.

Barcodes are basically a printed representation of data that can be optically scanned to read the data into a computer system. The data are often serial numbers, passport numbers, product identification numbers, quantities, etc. Barcodes operate on a simple principle of alternating black and white stripes/characters. The data is encoded into the barcode by a specific altering of these stripes to present a pattern of these stripes that can be scanned and recognized by a computer system.

There are several standards for barcodes, but generally, two types: linear and two dimensional. Linear barcodes are the best known and appear as a linear set of thin or thick black bars separated by thin or thick white spaces. Two dimensional barcodes contain more data and appear as a cluster of black and white squares within a border of black and white lines. As an example, a linear barcode such as might appear on a cereal box might have 10 decimal digits of information while a one inch square two dimensional barcode is able to encode the entire U.S. Constitution.

Several standards have evolved regarding the printing and scanning of barcodes. Using such standards assures that, by printing a barcode following a given standard, the barcode will be readily scanned by a scanner designed to scan that given standard. Each standard has its own pattern of black lines and white spaces and rules for encoding characters (numbers or letters/numbers). For example, the best known barcode standard is the Universal Price Code called U.P.C./EAN.

Barcodes are often printed directly on the product packaging, often typeset along with other label information. Alternately, a barcode is printed on a label that is applied to an object. The labels cam be printed on a standard printer such as an inkjet or LaserJet printer; or there are many specialized label printers such as those manufactured by Zebra Technologies Corporation.

Several applications for barcodes require printing of the barcodes from within a standardized computer application such as Microsoft Corporation's Publisher®, Word® and Excel® or CrystalReports from BusinessObjects®. There are many uses for printing barcodes within documents, not to mention the simple printing of labels. One example is printing of user manuals that contain a barcode on the front or back cover. Lately, barcodes have appeared as a way to track documents. Often, especially under process controls such as required by ISO9000, product development documents are distributed at various stages and, to assure an entire team is working from the same base document, all copies are returned before distribution of updated copies. If each document is bar-coded with a serial number, the process of determining which documents have been returned is made more efficient and accurate.

Another application of barcodes on documents is security. In such, an identifying barcode (serial number) is printed on the cover and, optionally, every page of classified documents. Thereafter, if the document is copied, the barcode is copied as well and all copies can be traced back to the individual responsible for the original copy by the serial number of the copy.

To date, it has been difficult to embed bar-code printing into such software applications. Such barcode printing requires the installation of additional barcode fonts or barcode graphic objects. Implementation with barcode fonts requires two components be added to these software applications. The first is a special font designed specifically for barcode printing. The second is a program or macro (e.g., written in Microsoft Corporation's Visual Basic®) that accepts as input the data to be encoded as a barcode and outputs the proper font characters associated with the barcode standard encoding of the data. For example, IDAutomation.com, Inc., offers such fonts and software whereby a Microsoft's Excel® cell A2 containing "=Code128(A1)" would display a barcode for the data in cell A1 if the font of A2 is a barcode font from IDAutomation. Traditionally, when a barcode is needed in such a software application, it is either printed as a graphic object such as with an ActiveX control or as a barcode font. These graphic objects and barcode fonts must be installed on each computer that prints barcodes with the software application. This may cause problems on some computers and it increases the complexity, especially if documents are distributed to many computers, whereby, each computer requires the same drivers and additional fonts or the installation of a graphic object component. Additionally, implementation with barcode graphic objects is incompatible with many applications, such as how ActiveX Controls are incompatible with Crystal Reports for example.

The above system of printing barcodes within application works well for many software applications and for many uses. On the down side, it requires the installation of a special bar-code font or graphic objects which may have some limitations on the resulting barcode printing. For example, the height of a barcode font cannot be precisely adjusted because it has a fixed height assigned to it and they do not stack well.

Another method exists for creating barcodes from within a software application that doesn't use additional barcode fonts or graphics objects. An example of such is "Barcode Basics" found at www.BrianDunning.com. This method works by using spaces and the underscore character at Unicode location 95 rotated at a 290 degree angle with the line spacing reduced to 1 point. Each underscore becomes a black bar and each space becomes a white bar. Lines of the rotated bar and space patterns are then stacked to create a bar code symbol. This method works only in a very narrow subset of software applications (FileMaker is the only application known to date), probably because other applications cannot print the underscore and rotate it in the same way to create a proper barcode symbol.

What is needed is a system and method of printing barcodes from within an application that doesn't require special fonts and is scalable to print linear and two dimensional barcodes in varying sizes.

SUMMARY OF THE INVENTION

It is one objective of the present invention to enable the printing of barcodes without the use of additional barcode fonts by drawing the barcode from particular Unicode characters that exist in standard system fonts.

It is another objective of the present invention to enable the printing of barcodes without the use of additional barcode fonts by drawing the barcode from particular Unicode characters that exist in standard system fonts, with a formula that assembles, organizes and stacks the characters as necessary to form a correct barcode symbol and enabling the printing several different barcode types.

It is another objective of the present invention to enable the printing of barcodes without the use of additional barcode fonts and without requiring facilities to rotate individual characters, instead drawing the barcode from particular Unicode characters that exist in standard system fonts, with a formula that assembles, organizes and stacks the characters as necessary to form a correct barcode symbol and enabling the printing several different barcode types.

In one embodiment, a method for generating a printable barcode object representing data from within a software application is disclosed including converting the data into a symbol string based on a barcode standard and assembling into the printable barcode object a plurality of block code characters from a font, the plurality of block code characters representing the symbol string are any two or more Unicode character locations selected from the group consisting of $9600_{10}$, $9604_{10}$, $9608_{10}$, $9612_{10}$, $9616_{10}$, $9617_{10}$ and $32_{10}$.

In another embodiment, a system for generating a printable bar code object representing data from within a software application is disclosed including a computer system having at least a processor, memory and printer configured with at least one software application loaded on the computer, the software application(s) having at least one font loaded and having Unicode characters. Software is provided for converting the data to a symbol string based upon a barcode standard and for placing the Unicode characters into the printable bar code object based upon the symbol string and the barcode standard.

In another embodiment, a computer readable medium is tangibly embodying a program of instructions. The program of instructions is configured to generate at least one printable barcode corresponding to the data. Computer instructions are provided for converting the data into a symbol string based on a barcode standard and computer instructions are provided for assembling into the printable barcode object a plurality of block code characters from a font, the plurality of block code characters representing the symbol string are any two or more Unicode character locations selected from the group consisting of $9600_{10}$ (base 10), $9604_{10}$, $9608_{10}$, $9612_{10}$, $9616_{10}$, $9617_{10}$ and $32_{10}$.

In another embodiment, a signal is embodied in a propagation medium. The signal has at least one instruction configured to generate at least one printable barcode corresponding to data. The instructions include computer readable instructions for converting the data into a symbol string based on a barcode standard and computer readable instructions for assembling into the printable barcode object a plurality of block code characters from a font, the plurality of block code characters representing the symbol string are any two or more Unicode character locations selected from the group consisting of $9600_{10}$ (base 10), $9604_{10}$, $9608_{10}$, $9612_{10}$, $9616_{10}$, $9617_{10}$ and $32_{10}$.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
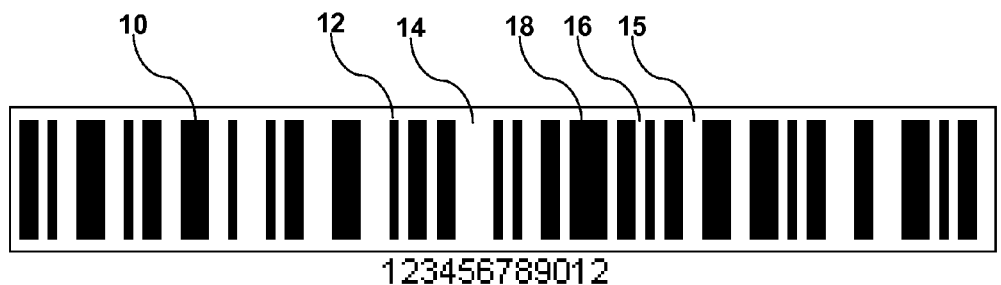
FIG. 1 illustrates a linear bar code printed by a system of the present invention.

Reference will now be made in detail to the presently preferred embodiments of the invention, examples of which are illustrated in the accompanying drawings. Throughout the following detailed description, the same reference numerals refer to the same elements in all figures.

This invention uses the Unicode block characters of black and white bars and creates the barcode symbol at normal orientation. By using such, the present invention supports linear, postal and two-dimensional barcode types. Therefore, the software and barcode printing/display are compatible with most computer applications because many software applications have the ability to print using the Unicode characters.

Referring to FIG. 1, a linear bar code printed by a system of the present invention will be described. The barcode is printed by appending Unicode characters as will be described later. For linear barcodes, Unicode characters are selected from those shown in Table-1. In general, one method of the present invention accepts a data and creates a print object containing a printable barcode using the Unicode characters from Table-1 and Table-2 to represent the data in barcode format. The data is converted into a symbol string, which is a representation of the barcode type. A symbol string is, for example, a string of digits, a string of letters, a set of codes or any form of encoding representative of a barcode in a particular barcode standard. For example, the symbol string of "211214142112214121221114311321211232" represents a Code 128 barcode. A barcode is an alternating black and white pattern that can be recognized by a scanner. Each character of the symbol string representing the width of the bar, were the first position is black. In this example, the barcode starts with a 2-width black bar followed by a 1-width white, a 1-width black, a 2-width white, a 1-width black, a 4-width white, and so on. The symbol string is determined by standards that define a barcode type and how information is encoded into the symbol string according to the standard. For example, the AIM Code 128 standard states that the letter "A" is represented by a symbol string of "223112". The entire Code 128 symbol string includes a start symbol string, data character symbol strings, a check digit symbol string and a stop symbol string. The symbol string is a representation of the barcode symbol that is determined from standards organizations that define how it is created. From the symbol string, the sequence names represented in Table-1 are combined to create a barcode representation of this string. For example, in the linear stacked barcode of FIG. 1, the string of "211244" would become "bb wb ww bb bb ww ww".

The "2" becomes 2 lines of black 10 or "bb"; "1" becomes one line of white 16; the next "1" becomes one bar of black 12, hence "wb"; the next "2" becomes two bar of white 15 or "ww"; the first "4" becomes four bars of black 18, hence "bb" "bb"; and the second "4" becomes four bars of white 14, hence "ww" "ww". The resulting string would be

[9608], [9616], [32], [9608], [9608], [32], [32]. In some situations it may be desirable to directly match each black bar "b" with character [9608] and each white bar "w" with the space [32].

The space character [32] is used when the font is monospaced (e.g., non-proportional or fixed character width) in which the space is the same width as the other Unicode characters. If the font is proportional (different width characters), then either two or three spaces [32] or the light shade character [9617] are used to represent the white space that is the width of two white bars, or in this example, [9608],[9616], [32],[32],[32],[9608],[9608],[32],[32],[32], [32],[32],[32]. It is preferred to use a fixed-width, mono-spaced system font such as "Courier New." When proportional fonts are used, the sequence name of "ww" takes on an appropriate character or series of characters that represents a space very close to or equal in width of character [9608] "full block". This is usually performed with 2 or 3 [32] ("space") characters or the [9617] "Light Shade" character.

The height of a linear barcode must often be precisely defined. To create a linear barcode taller than one character in height, multiple strings of the same pattern are appended over each other in the printable output object. Therefore, in the above example, a barcode of four characters in height would be:

[9608], [9616],[32], [9608], [9608], [32], [32]
[9608], [9616], [32], [9608], [9608], [32], [32]
[9608], [9616], [32], [9608], [9608], [32], [32]
[9608], [9616], [32], [9601], [9608], [32], [32]

TABLE 1

Unicode Character Locations for Linear, Two Dimensional Stacked and Postal

| UNICODE LOCATION | SEQUENCE NAME | DESCRIPTION | CHARACTER |
|---|---|---|---|
| 9608 | bb | Full Block | ■ |
| 9612 | bw | Left Half Block | ▌ |
| 9616 | wb | Right Half Block | ▐ |
| 9617 | ww | Light Shade | ░ |
| 32 | ww | Space | |

TABLE 2

Unicode Character Locations for 2-Dimensional Matrix Barcodes

| UNICODE LOCATION | SEQUENCE NAME | DESCRIPTION | CHARACTER |
|---|---|---|---|
| 9600 | bw | Upper Half Block | ▀ |
| 9604 | wb | Lower Half Block | ▄ |
| 9608 | bb | Full Block | █ |
| 9617 | ww | Light Shade | ░ |
| 32 | ww | Space | |

Figure 2:
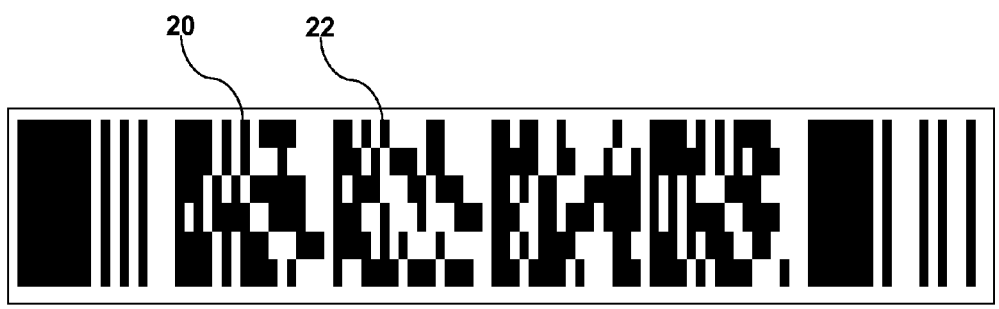
FIG. 2 illustrates a two dimensional, stacked bar code printed by a system of the present invention.

Referring to FIG. 2, a two dimensional, stacked bar code printed by a system of the present invention will be described. Two dimensional stacked barcode types such as PDF417 are created in the same way, except that each stacked row contains different encoded data. The symbol string of barcode types such as two dimensional barcodes may be represented as stacked characters 20/22 from FIG. 2.

Figure 3:
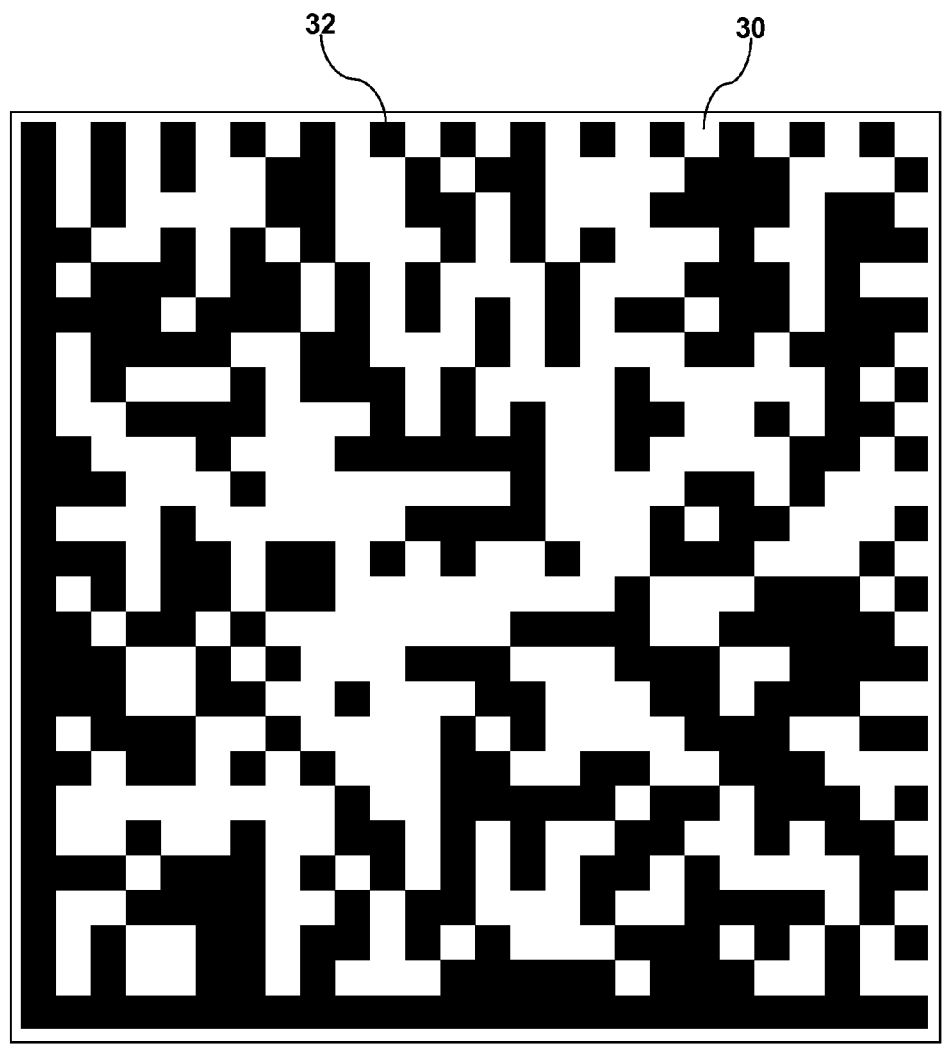
FIG. 3 illustrates a two dimensional matrix bar code printed by a system of the present invention.

Referring to FIG. 3, a two dimensional matrix bar code printed by a system of the present invention will be described. In this, the block characters from Table 2 are used to generate the encoded series of black squares 32 and white squares 30 by vertically pairing up two rows at a time with the appropriate symbol. For example, a symbol string of "10" on the first row and "01" on the second row would become "bw" 32 and "wb" 30.

Figure 4:
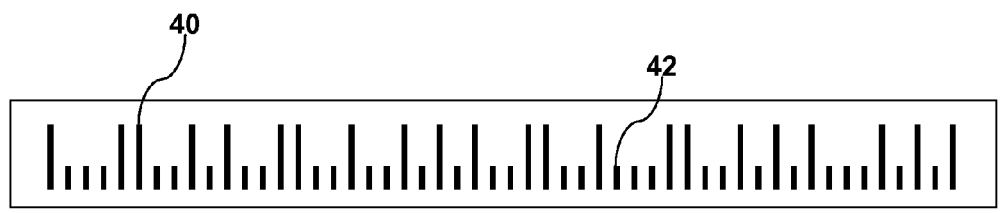
FIG. 4 illustrates a "Postnet" postal bar code printed by a system of the present invention.

Referring to FIG. 4, a "Postnet" postal bar code printed by a system of the present invention will be described. In the preferred embodiment, the symbol string of barcode types such as Postal barcodes is represented as rows of several ones and zeros, for example "100011", which indicates tall and short bars or black and white spaces. In a Postnet Postal barcode, the string of "100011" would become bw ww ww ww ww ww bw wb
bw wb ww bw wb ww bw wb whereas each 1 represents a tall bar 40 and each 0 represents a short bar 42 with two spaces between them.

Figure 5:
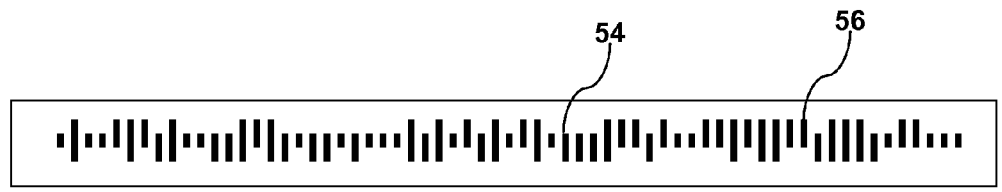
FIG. 5 illustrates a "OneCode" postal bar code printed by a system of the present invention.

Referring to FIG. 5, a "OneCode" postal bar code printed by a system of the present invention will be described. In the preferred embodiment, the symbol string of "OneCode" barcodes is represented as two rows of several ones and zeros, for example "100011" and "100001", which the first row indicates upward bars 56 and the second row indicates downward bars 54 of black in white spaces. In a "OneCode" Postal barcode, the string of "100011" and "100001" would become:

bw ww ww ww ww ww bw wb
bw wb ww bw wb ww bw wb
bw ww ww ww ww ww ww wb

Figure 6:
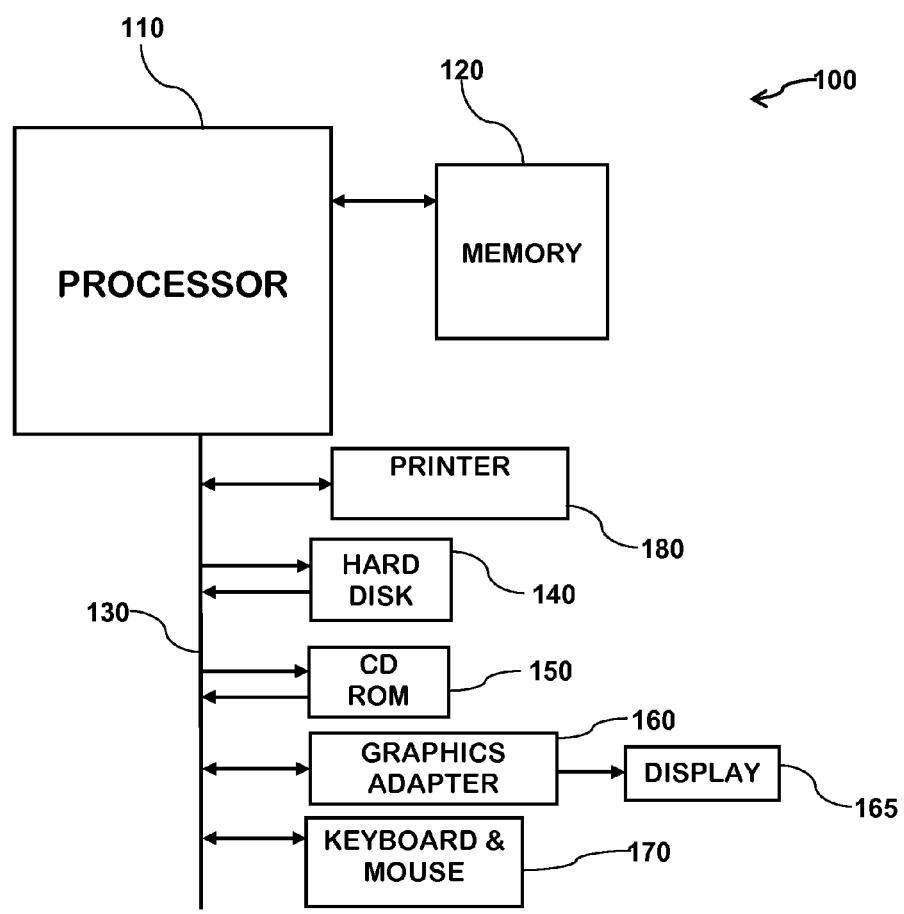
FIG. 6 illustrates an exemplary computer system as utilized by the present invention.

Referring to FIG. 6, an exemplary computer system as utilized by the present invention will be described. The computer system 100 is shown for completeness and is a simplified example of a typical computer system as used to run software applications that operate with barcode software such as disclosed here within. The computer system 100 has a processor 110 and associated memory 120. This is an exemplary system and any suitable processor and memory can be substituted including, for example, an Intel® Pentium IV. The memory is any suitable memory for such a processor, including SDRAM and DDR. A system bus 130 interfaces the processor 110 to peripheral devices as discussed below.

The processor 110 displays information, alerts, prompts, etc., using a graphics controller 160 and associated display 165. In most embodiments, a hard disk 140 is provided for persistent storage of programs and data and a CD-ROM 150 is provided for loading and copying of data, files and programs. A keyboard and mouse 170 are provided for accepting user input. A printer 180 is provided for generating hard copy of the files created by the applications along with the disclosed barcodes.

Figure 7:
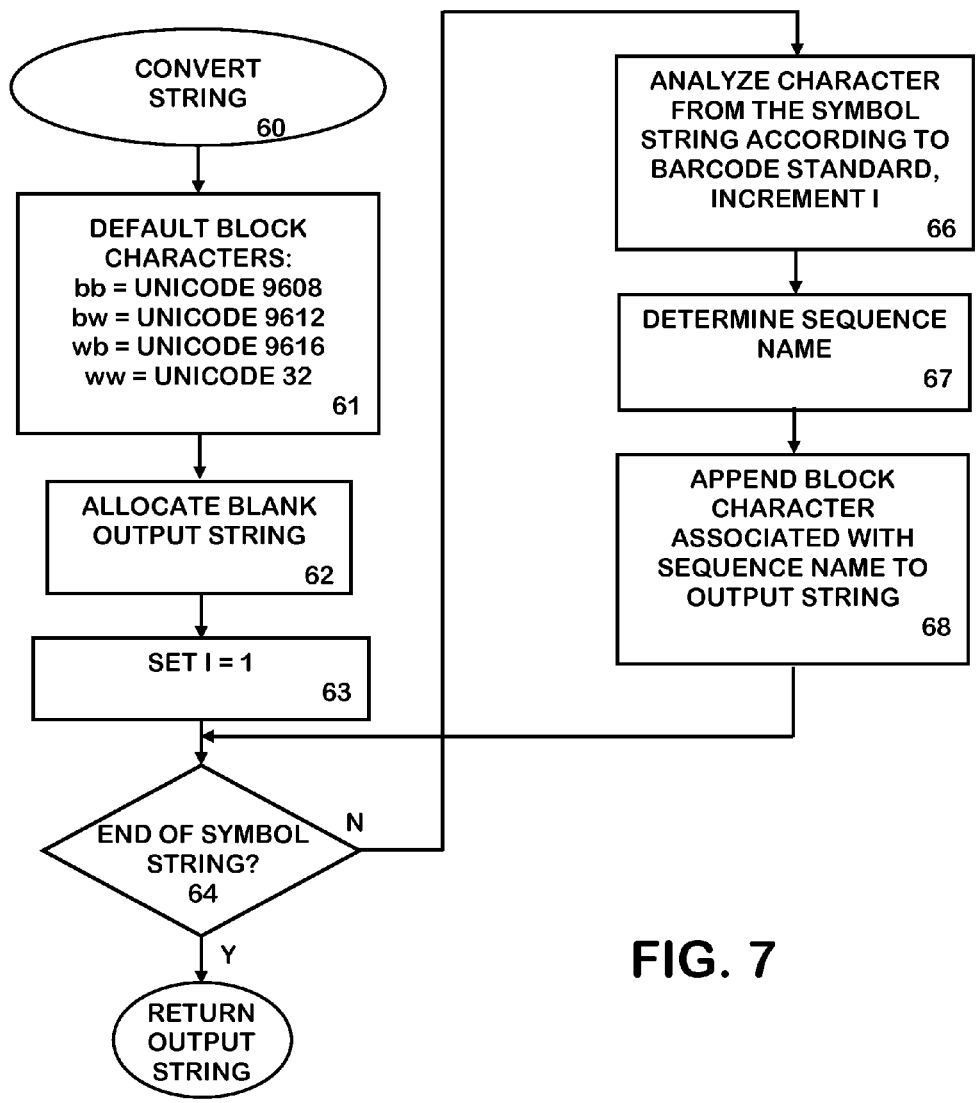
FIG. 7 illustrates a sample program flow of a system of the present invention.

Referring to FIG. 7, a sample program flow of a system of the present invention will be described. The first step is to assign the proper Unicode characters to represent two black marks (bb), a black mark followed by a white mark (bw), a white mark followed by a black mark (wb) and two white marks (ww) 61. An output string is allocated and made empty 62 and an index is set to a starting point 63. A next character from the index string is analyzed according to the barcode type 66 and a sequence name is determined (bb, bw, wb, ww) 67 and the appropriate Unicode character is appended onto the output string 68. If the end of the symbol string is found 64, the output string is returned. A sample program listing showing an exemplary implementation of a linear barcode type such as in FIG. 1 of the present invention is shown in Table 3.

TABLE 3

Sample Program Listing

```
'******************************************************************
'* IDAutomation Native Barcode Generator for Crystal Reports
'* Copyright 2006, IDAutomation.com, Inc. All rights reserved.
'******************************************************************
Dim DataToEncode As String
Dim BarHeight As Number
'Modify the next line to connect to the data source:
DataToEncode = {Table1_.TextData}
'Modify the next line to change the barcode height:
BarHeight = 4
Dim MonoSpaceFont As Boolean
'Change MonoSpaceFont to equal False when not using a mono-spaced font
'such as Courier New. Barcodes may not be completely accurate when using
'proportional fonts.
MonoSpaceFont = True
Dim ArrayBase As Number
ArrayBase = 1 'Array Base is 1 in Crystal Reports and 0 in Microsoft VB
Dim setC128(128) As String
setC128 = Array( _
"212222","222122","222221","121223","121322","131222", _
"122213","122312","132212","221213","221312","231212", _
"112232","122132","122231","113222","123122","123221", _
"223211","221132","221231","213212","223112","312131", _
"311222","321122","321221","312212","322112","322211", _
"212123","212321","232121","111323","131123","131321", _
"112313","132113","132311","211313","231113","231311", _
"112133","112331","132131","113123","113321","133121", _
"313121","211331","231131","213113","213311","213131", _
"311123","311321","331121","312113","312311","332111", _
"314111","221411","431111","111224","111422","121124", _
"121421","141122","141221","112214","112412","122114", _
"122411","142112","142211","241211","221114","413111", _
"241112","134111","111242","121142","121241","114212", _
"124112","124211","411212","421112","421211","212141", _
"214121","412121","111143","111341","131141","114113", _
"114311","411113","411311","113141","114131","311141", _
"411131","211412","211214","211232","2331112")
Dim WeightedTotal As Number
WeightedTotal = 104
Dim SymbolString As String
Dim StringLength As Number
StringLength = Len(DataToEncode)
Dim CurrentCharNum As Number
Dim CurrentValue As Number
Dim CheckDigitValue As Number
Dim PrintableString As String
Dim Factor As Number
Factor = 3
PrintableString = " "
SymbolString = setC128(104 + ArrayBase)
```

TABLE 3-continued

Sample Program Listing

```
Dim I As Number
For I = 1 To StringLength
    CurrentCharNum =(AscW(Mid(DataToEncode, I, 1))) – 32
    CurrentValue = CurrentCharNum * I
    WeightedTotal = WeightedTotal + CurrentValue
    SymbolString = SymbolString & setC128(CurrentCharNum + ArrayBase)
Next I
DataToEncode = " "
CheckDigitValue = WeightedTotal Mod 103
SymbolString = SymbolString & SetC128(CheckDigitValue + ArrayBase)
    & SetC128(106 + ArrayBase)
'At this point in the code, SymbolString is the entire barcode string in
number form
'For example: 21121414211221412122111431132121211232
'Convert SymbolString to PrintableString
Dim ww As String
Dim wb As String
Dim bw As String
Dim bb As String
ww = ChrW(32) 'SPACE
If MonoSpaceFont = False Then ww = ChrW(32) & ChrW(32) & ChrW(32)
wb = ChrW(9616)
bw = ChrW(9612)
bb = ChrW(9608)
CurrentValue = 0
PrintableString = " "
Dim NextDigitUsed As Number
Dim StartOver As Number
NextDigitUsed = 0
Dim SymbolStringLength
Dim J as Number
SymbolStringLength = Len(SymbolString)
For I = 1 To SymbolStringLength
    CurrentValue = Val(Mid(SymbolString, I, 1))
    If NextDigitUsed = 1 Then
        'Because the next digit is used, remove 1 from CurrentValue
        'unless CurrentValue is already 1
        If CurrentValue > 1 then
            CurrentValue = CurrentValue – 1
            NextDigitUsed = 0
        Else
            'CurrentValue was used in a previous step
            NextDigitUsed = 1
        End If
    End If
    If NextDigitUsed = 1 And CurrentValue = 1 Then
        'There is nothing more here to do because the CurrentValue
        'was used in a previous step
        NextDigitUsed = 0
    Else
        For J = 1 to CurrentValue
            If J = CurrentValue Then
                NextDigitUsed = 1
                'We are at the end of the bar segment, borrow 1 segment from
                the next
                If Factor = 3 Then PrintableString = PrintableString & bw
                If Factor = 1 Then PrintableString = PrintableString & wb
            Else
                NextDigitUsed = 0
                If Factor = 3 Then PrintableString = PrintableString & bb
                If Factor = 1 Then PrintableString = PrintableString & ww
                J = J+1
            End If
        Next J
    End If
    Factor = 4 –Factor
Next I
For I = 1 to BarHeight
    Formula = Formula & ChrW(10) & ChrW(13) & PrintableString
Next I
    'The Formula string is then sent to a text object where it
    is viewed, copied to memory, saved or printed.
```

Equivalent elements can be substituted for the ones set forth above such that they perform in substantially the same manner in substantially the same way for achieving substantially the same result. The present invention is not limited in any way to the types of barcodes generated. As standards organizations create new barcode types, the present invention is adaptable to generate those new barcode types.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method for generating a printable barcode object representing data from within a standardized software application, the method comprising:
    converting from within the standardized software application the data into a symbol string based on a barcode standard; and
    assembling from within the standardized software application into the printable barcode object a plurality of block code characters from a font, the plurality of block code characters representing the symbol string being any two or more characters of the UNICODE standard selected from the group consisting of $9600_{10}$, $9604_{10}$, $9608_{10}$, $9612_{10}$, $9616_{10}$, $9617_{10}$ and $32_{10}$.

2. The method for generating a printable barcode object of claim 1, further comprising:
    stacking a plurality of the printable barcode objects to produce a taller printable barcode object.

3. The method for generating a printable barcode object of claim 1, wherein the barcode standard is selected from the group consisting of linear barcode, two-dimensional matrix barcode, two-dimensional stacked barcode, postal barcode, postnet postal barcode and onecode postal barcode.

4. The method for generating a printable barcode object of claim 1, wherein the printable barcode object is embedded in a document.

5. The method for generating a printable barcode object of claim 1, wherein the symbol string comprises a series of digits, the digits in odd positions of the string representing the width of a black bar and the digits in even positions of the string representing the width of a white bar.

6. The method for generating a printable barcode object of claim 1, wherein the font is a fixed-width font and the plurality of block code characters representing the symbol string are any two or more characters of the UNICODE standard selected from the group consisting of $9600_{10}$, $9604_{10}$, $9608_{10}$, $9612_{10}$, $9616_{10}$, and $32_{10}$.

7. The method for generating a printable barcode object of claim 1, wherein the font is a proportional font and the plurality of block code characters representing the symbol string are any two or more characters of the UNICODE standard selected from the group consisting of $9600_{10}$, $9604_{10}$, $9608_{10}$, $9612_{10}$, $9616_{10}$, and $9617_{10}$.

8. A system for generating a printable bar code object representing data from within a standardized software application, the system comprising:
    a computer system having at least a processor, memory and printer;
    at least one standardized software application loaded on the computer system, the at least one standardized software application having at least one font loaded, the at least one font having characters of the UNICODE standard;
    software executing within one of the at least one standardized software applications for converting the data into a symbol string based upon a barcode standard; and
    software executing within the one of the at least one standardized software applications for placing the characters of the UNICODE standard into the printable bar code object based upon the symbol string and the barcode standard, the symbol string being any two or more characters of the UNICODE standard selected from the group consisting of $9600_{10}$, $9604_{10}$, $9608_{10}$, $9617_{10}$ and $32_{10}$.

9. The system for generating a printable bar code object of claim 8, wherein the software for placing characters of the UNICODE standard into the printable bar code object produces a higher printable barcode object by replicating multiple copies of the barcode within the printable object.

10. The system for generating a printable bar code object of claim 8, wherein the barcode standard is selected from the group consisting of linear barcode, two-dimensional matrix barcode, two-dimensional stacked barcode, postal barcode, postnet postal barcode and onecode postal barcode.

11. The system for generating a printable bar code object of claim 8, wherein the printable barcode object is printed.

12. The system for generating a printable bar code object of claim 8, wherein the symbol string comprises a series of digits, the digits in odd positions of the string representing the width of a black bar and the digits in even positions of the string representing the width of a white bar.

13. The system for generating a printable bar code object of claim 8, wherein the font is a fixed-width font and the plurality of block code characters representing the symbol string are any two or more characters of the UNICODE standard selected from the group consisting of $9600_{10}$, $9604_{10}$, $9608_{10}$, $9612_{10}$, $9616_{10}$, and $32_{10}$.

14. The system for generating a printable bar code object of claim 8, wherein the font is a proportional font and the plurality of block code characters representing the symbol string are any two or more characters of the UNICODE standard selected from the group consisting of $9600_{10}$, $9604_{10}$, $9608_{10}$, $9612_{10}$, $9616_{10}$, and $9617_{10}$.

15. A computer readable medium tangibly embodying a program of instructions, the program of instructions configured to generate at least one printable barcode corresponding to data, the program of instructions comprising:
    computer instructions for converting the data into a symbol string based on a barcode standard; and
    computer instructions for assembling the symbol string into the printable barcode object using a plurality of block code characters from a font, the plurality of block code characters representing the symbol string being any two or more characters of the UNICODE standard selected from the group consisting of $9600_{10}$, $9604_{10}$, $9608_{10}$, $9612_{10}$, $9616_{10}$, $9617_{10}$ and $32_{10}$,
    whereas the computer instructions are executed within a standardized application program.

16. The computer readable medium tangibly embodying a program of instructions, the program of instructions configured to generate at least one printable barcode of claim 15, further comprising:
    computer instructions for stacking a plurality of the printable barcode objects to produce a taller printable barcode object.

17. The computer readable medium tangibly embodying a program of instructions, the program of instructions configured to generate at least one printable barcode of claim 15, wherein the barcode standard is selected from the group consisting of linear barcode, two-dimensional matrix barcode, two-dimensional stacked barcode, postal barcode, postnet postal barcode and onecode postal barcode.

18. The computer readable medium tangibly embodying a program of instructions, the program of instructions configured to generate at least one printable barcode of claim 15, wherein the symbol string comprises a series of digits, the digits in odd positions of the string representing the width of a black bar and the digits in even positions of the string representing the width of a white bar.

19. The computer readable medium tangibly embodying a program of instructions, the program of instructions configured to generate at least one printable barcode of claim 15, wherein the font is a fixed-width font and the plurality of block code characters representing the symbol string are any two or more characters of the UNICODE standard selected from the group consisting of $9600_{10}$, $9604_{10}$, $9608_{10}$, $9612_{10}$, $9616_{10}$, and $32_{10}$.

20. The computer readable medium tangibly embodying a program of instructions, the program of instructions configured to generate at least one printable barcode of claim 15, wherein the font is a proportional font and the plurality of block code characters representing the symbol string are any two or more characters of the UNICODE standard selected from the group consisting of $9600_{10}$, $9604_{10}$, $9608_{10}$, $9612_{10}$, $9616_{10}$, and $9617_{10}$.

21. A computer readable medium tangibly embodying a program of instructions, the program of instructions comprising:
   computer executable instructions for providing a standardized computer application;
   computer executable instructions for accepting a data from the computer executable instructions for providing a standardized computer application and for converting the data into a symbol string based on a barcode standard; and
   computer executable instructions for assembling the symbol string into a printable barcode object using a plurality of block code characters from a font, the plurality of block code characters representing the symbol string are any two or more characters of the UNICODE standard selected from the group consisting of $9600_{10}$, $9604_{10}$, $9608_{10}$, $9612_{10}$, $9616_{10}$, $9617_{10}$ and $32_{10}$.

22. The computer readable medium tangibly embodying a program of instructions of claim 21, wherein the computer executable instructions for providing a standardized computer application implement a standardized application selected from the group consisting of a word processor, a spreadsheet and a presentation generator.

23. The computer readable medium tangibly embodying a program of instructions of claim 21, wherein the font is a fixed-width font and the plurality of block code characters representing the symbol string are any two or more characters of the UNICODE standard selected from the group consisting of $9600_{10}$, $9604_{10}$, $9608_{10}$, $9612_{10}$, $9616_{10}$, and $32_{10}$.

24. The computer readable medium tangibly embodying a program of instructions of claim 21, wherein the font is a proportional font and the plurality of block code characters representing the symbol string are any two or more characters of the UNICODE standard selected from the group consisting of $9600_{10}$, $9604_{10}$, $9608_{10}$, $9612_{10}$, $9616_{10}$, and $9617_{10}$.

25. The computer readable medium tangibly embodying a program of instructions of claim 21, further comprising:
   computer executable instructions for stacking a plurality of the printable barcode objects to produce a taller printable barcode object.

\* \* \* \* \*